United States Patent Office 2,766,249

Patented Oct. 9, 1956

2,766,249

PRODUCTION OF STILBENE DERIVATIVES AND PRODUCTS

Adolph J. Deinet, Woodcliff Lake, and David X. Klein, Upper Montclair, N. J., assignors to Heyden Chemical Corporation, New York, N. Y., a corporation of Delaware No Drawing. Application January 13, 1955, Serial No. 481,712

5 Claims. (Cl. 260—294.8)

The present invention relates to a novel method of producing salicoyl derivatives of 4,4′-diamino stilbene 2,2′-disulfonic acid and to the novel derivatives obtained.

Certain benzoyl chloride compounds substituted in the ortho position have been reacted with 4,4′-diaminostilbene 2,2′-disulfonic acid to form the corresponding dibenzoyl compounds. For example, o-acetyloxy benzoyl chloride ($CH_3COO.C_6H_4COCl$) or o-methoxy benzoyl chloride ($CH_3OC_6HCOCl$) can be reacted with 4,4′-diaminostilbene 2,2′-disulfonic acid to form 4,4′-di(o-acetyloxy)-benzoyl diaminostilbene 2,2′-disulfonic acid or 4,4′-di(o-methoxy)-benzoyl diaminostilbene 2,2′-disulfonic acid. Such a reaction is carried out in an aqueous medium containing sodium hydroxide or other alkaline compound which neutralizes the hydrochloric acid formed during the reaction.

Salicoyl chloride, o-hydroxy benzoyl chloride, can not be reacted with 4,4′-diaminostilbene 2,2′-disulfonic acid in the manner described above to produce 4,4′-disalicoylaminostilbene 2,2′-disulfonic acid in a satisfactorily high yield. The hydroxyl (—OH) group renders the adjacent (—COCl) group highly reactive so that the salicoyl chloride is readily converted to salicylic acid in the presence of water and this acid will react with any alkaline compound present to form the corresponding salicylate.

We have discovered that salicoyl chloride can be reacted with 4,4′-diaminostilbene 2,2′-disulfonic acid in the presence of pyridine to produce in high yield the dipyridine salt of 4,4′-disalicoylaminostilbene 2,2′-disulfonic acid. This reaction can be represented by the following equation:

diaminostilbene 2,2′-disulfonic acid. The exact amount of the molal excess of pyridine is not critical and any excess which has sufficient solvent power to permit carrying out of the reaction is sufficient. The fact that the pyridine reacts with the hydrochloric acid is important, as free hydrochloric acid would tend to make the reaction reversible and lower the yield. Thus, the pyridine drives the reaction toward completion.

The reaction is preferably carried out at the reflux temperature although lower temperatures may be used with a consequent increase in the reaction time. Some heating is required, as the reaction rate at room temperature is so slow as not to be appreciable. The dipyridine reaction product has limited solubility in pyridine and can be readily separated from the reaction mixture by cooling the reaction mixture followed by filtration to separate the precipitated product which is an important advantage. Preferably, the separated product is washed with a strong acid, for example, hydrochloric sulfuric, acetic or like acid, to dissolve and remove the accompanying pyridine, and the acid-washed product may be washed additionally with water to remove impurities. In this manner, the dipyridine salt may be produced in high yield and in a high degree of purity.

The dipyridine salt of 4,4′-disalicoylaminostilbene 2,2′-disulfonic acid may be used as an optical bleach for cellulosic materials, such as cotton, paper, linen and the like, which tend to develop an undesirable yellowish cast with age. This dipyridine salt has been found to be particularly useful for treating cellulosic fibrous material, such as paper, where the material is not subjected to subsequent washing with detergents and when applied from very dilute aqueous solutions.

The dipyridine salt of 4,4′-disalicoylaminostilbene 2,2′-disulfonic acid can be readily converted to the corresponding salt of an alkali metal or alkaline earth metal by treatment with an alkaline compound of one of these metals, such as an alkali metal or an alkaline earth hydroxide or carbonate. For example, the dipyridine salt may be suspended in water and sodium hydroxide added to form the disodium salt of 4,4′-disalicoylaminostilbene 2,2′-disulfonic acid. The liberated pyridine may, but not necessarily be removed by means of a selective solvent and then the disodium salt may be recovered in any suit-

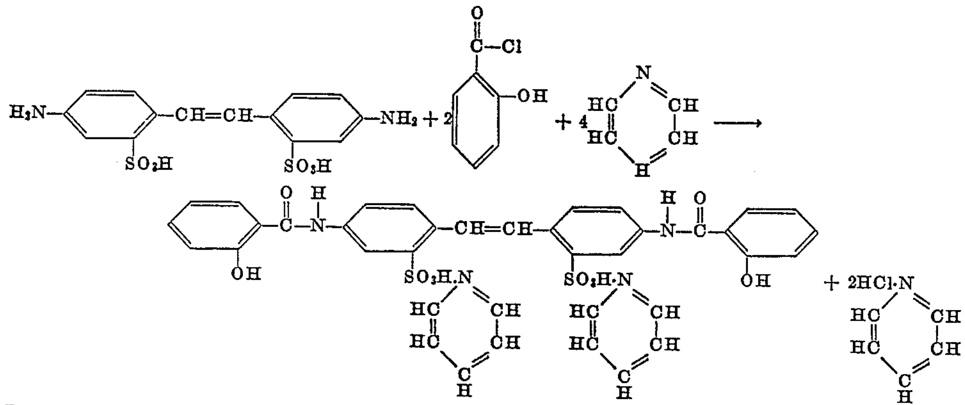

In accordance with the above reaction, 2 moles of salicoyl chloride and 4 moles of pyridine are required for each mole of 4,4-diaminostilbene 2,2′-disulfonic acid. An excess of salicoyl chloride is preferably used to increase the yield based on the amount of the substituted stilbene used. An excess of pyridine is required as it acts as a solvent for the reaction in addition to forming a salt with the two sulfonic acid groups and tying-up the hydrochloric acid. The pyridine apparently dissolves the salicoyl chloride and at least partially dissolves the 4,4- able manner. A soluble alkali metal salt, sodium chloride, may be added to the aqueous solution to precipitate the product by means of a "salting out" procedure. The precipitated product can be separated by filtration, washed, preferably with an alkaline aqueous solution, and thereafter dried. The alkaline salt, such as the disodium salt, may be converted to the free base by treatment with a strong acid which is stronger than the sulfonic acid groups.

*Example*

The following materials were charged into a flask equipped with an agitator and a reflux condenser:

600 ml. (7.58 mole) pyridine
51 g. (.138 mole) 4,4'-diaminostilbene 2,2'-disulfonic acid
75 g. (.44 mole) salicoyl chloride (91–92%)

The mixture was heated and stirred at reflux for 3 hours. Some of the dipyridine salt of 4,4'-disalicoylaminostilbene 2,2'-disulfonic acid precipitated out of the hot reaction liquor. The reacted mixture was cooled to 25° C. The product was separated by filtration, washed with 10% hydrochloric acid to remove the pyridine and then washed with water and dried. The dried product weighed 61 g., and the yield was 73% by weight based on the weight of 4,4'-diaminostilbene 2,2'-disulfonic acid charged. Anaylsis showed the product to be the dipyridine salt of 4,4'-disalicoylaminostilbene 2,2'-disulfonic acid.

The foregoing example was carried out under substantially anhydrous conditions and no water was added as such. The presence of appreciable quantities of water would reduce the yield and fully anhydrous conditions are preferable although small or trace amounts of water may be present as an impurity.

We claim:

1. The dipyridine salt of 4,4'-disalicolyaminostilbene 2,2'-disulfonic acid.

2. In the production of diaminostilbene disulfonic acid compounds, heating and reacting 4,4'-diaminostilbene 2,2'-disulfonic acid with salicoyl chloride in the presence of a molal excess of pyridine to produce a reaction mixture containing the dipyridine salt of 4,4'-disalicoylaminostilbene 2,2'-disulfonic acid.

3. In the production of diaminostilbene disulfonic acid compounds, the steps comprising heating and reacting 4,4'-diaminostilbene 2,2'-disulfonic acid with salicoyl chloride in the presence of a molal excess of pyridine to produce a reaction mixture containing the dipyridine salt of 4,4'-disalicoylaminostilbene 2,2'-disulfonic acid, cooling the reaction mixture and separating the precipitated dipyridine salt of 4,4'-disalicoylaminostilbene 2,2'-disulfonic acid, and washing the separated dipyridine salt with acid.

4. In the production of diaminostilbene disulfonic acid compounds, the steps comprising heating and reacting 4,4'-diaminostilbene 2,2'-disulfonic acid with salicoyl chloride in the presence of a molal excess of pyridine to produce a reaction mixture containing the dipyridine salt of 4,4'-disalicoylaminostilbene 2,2'-disulfonic acid, separating from the reaction mixture the dipyridine salt of 4,4'-disalicoylaminostilbene 2,2'-disulfonic acid and reacting the separated dipyridine salt with an alkaline compound selected from the group consisting of alkali metal and alkaline earth hydroxides and carbonates to form the corresponding di-alkaline compound salt of 4,4'-disalicoylaminostilbene 2,2'-disulfonic acid.

5. In the production of diaminostilbene disulfonic acid compounds, heating a substantially anhydrous mixture of 4,4'-diaminostilbene 2,2'-disulfonic acid, salicoyl chloride and a molal excess of pyridine to about reflux temperature to form a reaction mixture containing pyridine and the dipyridine salt of 4,4'-disalicoylaminostilbene 2,2'-disulfonic acid, and thereafter separating the said dipyridine salt from the reaction mixture.

References Cited in the file of this patent

UNITED STATES PATENTS

| | | |
|---|---|---|
| 2,477,731 | Friedmann et al. | Aug. 2, 1949 |
| 2,563,354 | Munro | Aug. 7, 1951 |